C. E. MILLER.
Grain-Drill.
No. 41,314.
Patented Jan. 19, 1864.
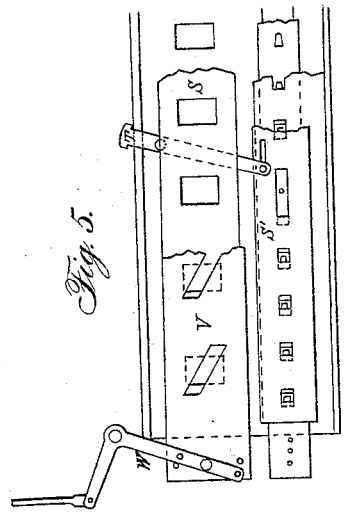
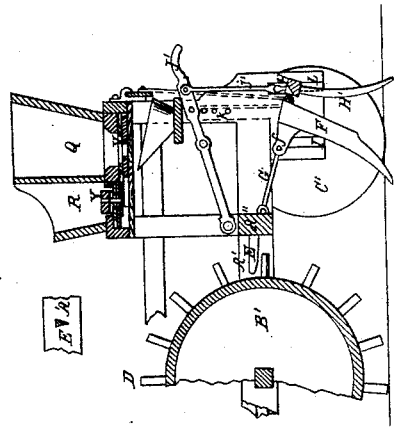
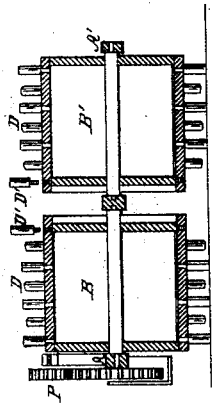
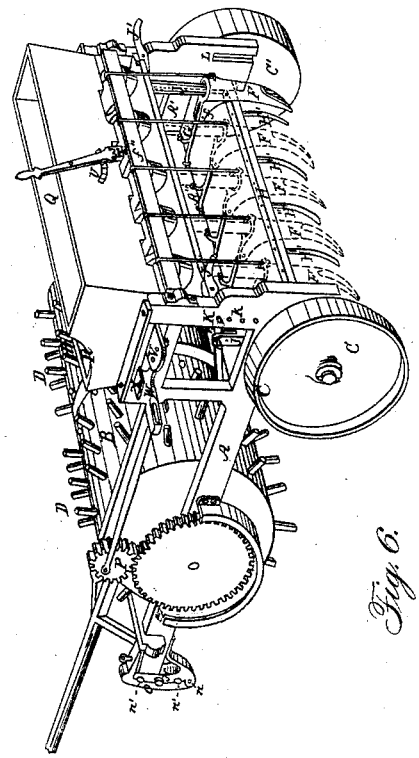
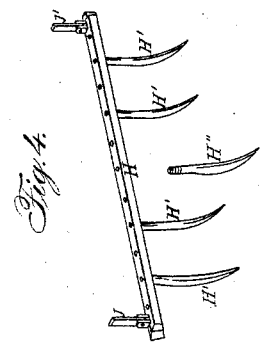
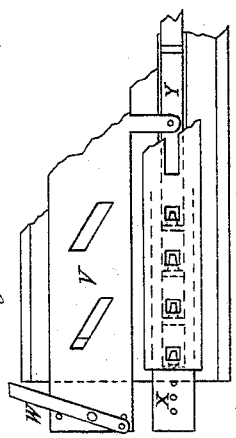
Witnesses:
Charles L. Fisher
Lyman Walker
Inventor:
C. E. Miller
pr Knight Bros
attys.

UNITED STATES PATENT OFFICE.

CHARLES E. MILLER, OF AMELIA, OHIO.

IMPROVEMENT IN CULTIVATOR AND SEEDER.

Specification forming part of Letters Patent No. 41,314, dated January 19, 1864.

*To all whom it may concern:*

Be it known that I, CHARLES E. MILLER, of Amelia, Clermont county, Ohio, have invented a new and useful Tilling and Seeding Machine; and I do hereby declare the following to be a full, clear, and exact description thereof, reference being had to the accompanying drawings, making part of this specification.

My invention relates to a provision for preparing ground for seed and for sowing the same, the tilling apparatus being intended to be used either by itself or in conjunction with the seeding apparatus, as necessity arises.

Figure 1 is a perspective view of the machine viewed from the rear. Fig. 2 is a vertical axial section of the clod-crushing apparatus. Fig. 3 is a longitudinal section of the machine. Fig. 4 shows the raking sod-cutting and seed-covering device detached. Fig. 5 shows the gaging and cutting-off slide detached. Fig. 6 shows the distributing-slides detached.

The front portion of the frame A A′ A″ is supported on two clod-crushing rollers, B B′, journaled and rotating independently of each other, and its rear portion on two wheels, C C′, which wheels may either rotate on fixed axles, as shown, or may be in form of casters. The periphery of each roller B B′ is studded with equidistant blunt studs, pins, or spikes D D′, which should be of iron or steel. Of these studs those, D′, of the two inner rows are merely screwed into the periphery, so as to be capable of being removed for a purpose to be presently explained.

Projecting forward from a cross-rail, A″, of the frame are a number of knives, E, which act to sever all trash that may collect upon the studs and cause said trash to drop upon the ground.

F are drill-teeth, secured by hinges $f$ and by short drag-bars G, hinged to the rear side of the cross-rail A″.

In order to insure and complete the preparation of the ground for the proper reception and covering of said seed, I have provided an appendage which I call my "raking, sod-cutting, and seed-covering attachment," being adapted to be used for one or other of those services, according to the condition of the ground. This attachment consists of a beam, H, armed with a series of curved blades, H′ H″, which blades are sharpened on their convex edges. In order to secure the attachment against lateral displacement, the ends of the beam H are made to occupy sockets I in the frame. The device H H′ H″ is adjusted vertically with respect to the frame by means of levers and rods J $j$ J′ $j'$, and is held to any particular adjustment by means of pins K, occupying holes $k$ $k'$ in the frame. By placing the concave edge forward, as shown in Fig. 1, the blades H′ H″ act to rake forward all trash and prevent the clogging of the drill-teeth. This form of the device is especially useful where the ground is covered with dead weeds or the stubble of previous crops. Where the ground is covered with a matting of fine roots, or of a growth of thick sod, the attachment H H′ H″ is reversed, so as to present the sharp convex edges of the blades forward. (See Fig. 3.) The blades H′ H″ in this position act to sever the roots of grass and other plants which would interfere with the proper earthing of the seed. For the two uses just explained the blades H′ H″ may be placed in the beam H as to immediately precede the drill-teeth. By placing the attachment H H′ H″ in bearings L in the rear of the drill-teeth, and immediately opposite the intervals thereof, the blades H′ H″ perform the function of grain-coverers. (See Fig. 3.) The central blade, H″, and the central tiers of studs, D′, being removed, and the seeding apparatus being removed or closed, the implement is admirably adapted for tilling on both sides of a row of young corn or cotton. When the attachment H H′ H″ is employed as a rake in front of the drill-teeth, the blades H′ H″ and the drill-teeth may be relieved of trash by momentarily lifting the attachment H H′ H″ by means of the levers J J′ and the drill-teeth by means of the customary lifting-board, $f''$.

In order to enable a greater downward pressure to be directed either to the front or to the rear parts of the machine, as necessity may arise, I couple my pole or tongue to the frame by means of a peculiar clevis, of which there is one at each side of the machine. This clevis consists of two jaws, N O, of which one jaw, N, depends rigidly from the frame, and the other one, O, is hinged ($n$) thereto. Each jaw is notched ($n'$) so as, when closed, to afford sockets for the tail-bolts of the coupling-pole. Thus when the cloddiness of the ground makes it desirable that the rollers B B' should press heavily, the pole is coupled in the upper notches; but when the chief pressure is desired on the seed-planting apparatus, the pole is coupled in the lower notches.

The seed-distributing mechanism may be of any approved construction, and may be connected by gearing P with one of the rollers B. The seed-hopper is separated into two compartments, Q and R, for small grain and for grass or clover, respectively. These compartments can be simultaneously closed by means of the slides S S', operated by a lever, T. A graduated scale, U, upon the outside of the hopper enables the operator to set the slides S S' to sow any given quantity to the acre, either of small grain or of grass.

In order to adapt the implement to the purposes of tillage on both sides of a row of young corn or cotton, the inner tiers, D', of studs are made capable of being unscrewed from the peripheries of the rollers, and the two middle teeth, H'', of the device H H' H'' are similarly removable.

I so attach my seeding apparatus as to be easily unshipped when the implement is wanted for preparing the ground, or for tillage, merely. (See Fig. 1.)

The slide V for distributing the wheat and other small grain may be made to have a greater or less stroke by attaching it nearer to or farther from the center of the vibrating perforated arm W.

X is a slide, which, being slipped farther in out, regulates the quantity of grass-seed.

Y is an agitator for stirring the grass-seed in the hopper, and may be either a notched rod, as shown, or a series of brushes.

An obvious advantage of the divided or separate rollers B B' is seen in the interval or space permitting them to straddle a growing crop in the act of tillage.

I claim herein as new and of my invention—

1. The provision of separate clod-crushing rollers B B', having their middle tiers of studs D', adapted for removable when the implement is required for tilling young corps, as herein explained.

2. The device or attachment H H' H'', arranged and adapted as and for the several purposes set forth.

3. In the described combination, the pair of armed rollers B B', provided with removable studs D', clearing-teeth E, and sod cutter or rake H, having removable blades H'', for the purposes of cultivation, as set forth.

4. The described combination of clod-crushers B B', clearing and cutting teeth E and H' H'', and clevis N O, the whole being arranged and adapted to operate either with or without a seed-depositing apparatus, as set forth.

In testimony of which invention I hereunto set my hand.

C. E. MILLER.

Witnesses:
 GEO. H. KNIGHT,
 FRANK A. DIAL.